US 7,593,996 B2

(12) United States Patent
Gole et al.

(10) Patent No.: US 7,593,996 B2
(45) Date of Patent: *Sep. 22, 2009

(54) SYSTEM AND METHOD FOR ESTABLISHING A PEER CONNECTION USING RELIABLE RDMA PRIMITIVES

(75) Inventors: Abhijeet Gole, Campbell, CA (US); Joydeep sen Sarma, Mountainview, CA (US)

(73) Assignee: NetApp, Inc., Sunnyvale, CA (US)

( * ) Notice: Subject to any disclaimer, the term of this patent is extended or adjusted under 35 U.S.C. 154(b) by 929 days.

This patent is subject to a terminal disclaimer.

(21) Appl. No.: 10/622,565

(22) Filed: Jul. 18, 2003

(65) Prior Publication Data

US 2005/0015459 A1   Jan. 20, 2005

(51) Int. Cl.
*G06F 15/167* (2006.01)
(52) U.S. Cl. .............. 709/212; 370/214; 370/400; 370/464; 370/471; 710/38; 711/162
(58) Field of Classification Search ............ 709/212; 370/214, 400, 464, 471; 710/38; 711/162
See application file for complete search history.

(56) References Cited

U.S. PATENT DOCUMENTS

| 4,937,763 | A |   | 6/1990  | Mott |
|---|---|---|---|---|
| 5,067,099 | A |   | 11/1991 | McCown et al. |
| 5,157,663 | A |   | 10/1992 | Major et al. |
| 5,163,131 | A |   | 11/1992 | Row et al. |
| 5,355,453 | A |   | 10/1994 | Row et al. |
| 5,485,579 | A |   | 1/1996  | Hitz et al. |
| 5,633,999 | A |   | 5/1997  | Clowes et al. |
| 5,680,580 | A | * | 10/1997 | Beardsley et al. ............ 714/6 |
| 5,781,770 | A | * | 7/1998  | Byers et al. ................. 713/502 |
| 5,802,366 | A |   | 9/1998  | Row et al. |
| 5,812,748 | A |   | 9/1998  | Ohran et al. |
| 5,812,751 | A |   | 9/1998  | Ekrot et al. |
| 5,819,292 | A |   | 10/1998 | Hitz et al. |
| 5,931,918 | A |   | 8/1999  | Row et al. |

(Continued)

FOREIGN PATENT DOCUMENTS

| WO | WO-99/59064 A1 | 11/1999 |
|---|---|---|
| WO | WO 01/35244 A1 | 5/2001 |

OTHER PUBLICATIONS

"Predefined"—definition from dictionary.com, Webster's Revised Unabridged Dictionary (c) 1996, 1998 MICRA, Inc. Http://dictionary.reference.com/browse/predefine.*

(Continued)

*Primary Examiner*—Kenny S Lin
*Assistant Examiner*—Tauqir Hussain
(74) *Attorney, Agent, or Firm*—Cesari and McKenna, LLP

(57) ABSTRACT

A system and method for reliable peer-to-peer communication is provided. The system and method includes a cluster connection manager that acts as a unified resource for opening, closing and maintaining peer-to-peer communication channels between applications executing on storage systems comprising a storage system cluster. The cluster connection manager communicates with cluster connection manager clients to maintain and manage the communication channels. The cluster connection manager may also be operatively interconnected with a plurality of cluster interconnect devices, thereby enabling failover operation in the event that a cluster interconnect device suffers an error condition.

28 Claims, 4 Drawing Sheets

U.S. PATENT DOCUMENTS

| | | | |
|---|---|---|---|
| 5,941,972 A | 8/1999 | Hoese et al. | |
| 5,948,110 A | 9/1999 | Hitz et al. | |
| 5,950,225 A | 9/1999 | Kleiman et al. | |
| 5,951,695 A | 9/1999 | Kolovson | |
| 5,963,962 A | 10/1999 | Hitz et al. | |
| 5,964,886 A | 10/1999 | Slaughter et al. | |
| 5,991,797 A * | 11/1999 | Futral et al. | 709/216 |
| 6,038,570 A | 3/2000 | Hitz et al. | |
| 6,065,037 A | 5/2000 | Hitz et al. | |
| 6,119,244 A | 9/2000 | Schoenthal et al. | |
| 6,138,126 A | 10/2000 | Hitz et al. | |
| 6,161,191 A | 12/2000 | Slaughter et al. | |
| 6,173,413 B1 | 1/2001 | Slaughter et al. | |
| 6,289,356 B1 | 9/2001 | Hitz et al. | |
| 6,292,905 B1 | 9/2001 | Wallach et al. | |
| 6,347,337 B1 * | 2/2002 | Shah et al. | 709/224 |
| 6,421,787 B1 | 7/2002 | Slaughter et al. | |
| 6,425,035 B2 | 7/2002 | Hoese et al. | |
| 6,460,080 B1 * | 10/2002 | Shah et al. | 709/224 |
| 6,542,924 B1 | 4/2003 | Abe | |
| 6,625,749 B1 | 9/2003 | Quach | |
| 6,675,200 B1 * | 1/2004 | Cheriton et al. | 709/212 |
| 6,728,897 B1 | 4/2004 | Cramer et al. | |
| 6,742,051 B1 * | 5/2004 | Bakshi et al. | 719/318 |
| 6,747,949 B1 * | 6/2004 | Futral | 370/231 |
| 6,760,304 B2 | 7/2004 | Uzrad-Nali et al. | |
| 6,799,220 B1 * | 9/2004 | Merritt et al. | 709/238 |
| 6,888,792 B2 * | 5/2005 | Gronke | 370/227 |
| 6,920,579 B1 | 7/2005 | Cramer et al. | |
| 6,952,792 B2 | 10/2005 | Emberty et al. | |
| 7,099,337 B2 | 8/2006 | Pinto | |
| 7,103,888 B1 * | 9/2006 | Cayton et al. | 719/313 |
| 7,171,476 B2 | 1/2007 | Maeda et al. | |
| 7,203,730 B1 | 4/2007 | Meyer et al. | |
| 2002/0055993 A1 * | 5/2002 | Shah et al. | 709/223 |
| 2002/0071386 A1 * | 6/2002 | Gronke | 370/217 |
| 2002/0114341 A1 * | 8/2002 | Sutherland et al. | 370/428 |
| 2003/0061296 A1 * | 3/2003 | Craddock et al. | 709/212 |
| 2003/0078946 A1 * | 4/2003 | Costello et al. | 707/201 |
| 2003/0088638 A1 | 5/2003 | Gluck et al. | |
| 2003/0115350 A1 | 6/2003 | Uzrad-Nali et al. | |
| 2004/0010545 A1 | 1/2004 | Pandya | |
| 2004/0019821 A1 | 1/2004 | Chu et al. | |
| 2004/0030668 A1 | 2/2004 | Pawlowski et al. | |
| 2004/0037319 A1 * | 2/2004 | Pandya | 370/469 |
| 2004/0049600 A1 * | 3/2004 | Boyd et al. | 709/250 |
| 2004/0064815 A1 | 4/2004 | Uzrad-Nali et al. | |
| 2004/0156393 A1 | 8/2004 | Gupta et al. | |
| 2004/0174814 A1 * | 9/2004 | Futral | 370/231 |
| 2004/0268017 A1 | 12/2004 | Uzrad-Nali et al. | |
| 2005/0166185 A1 * | 7/2005 | Plummer et al. | 717/118 |

OTHER PUBLICATIONS

European Search Report for Application No. EP 01 01 6755, Nov. 8, 2004 pp. 1-3.

David Hitz et al. TR3002 File System Design for a NFS File Server Appliance published by Network Appliance, Inc.

Fielding et al. (1999) Request for Comments (RFC) 2616, HTTP/1.1.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

NCI TS 332-1999 Fibre Channel Arbitrated Loop (FC-AL-2) published by the American National Standards Institute.

Virtual Interface Architecture Specification, Version 1.0, published by a collaboration between Compaq Computer Corp., Intel Corp., and Microsoft Corp.

* cited by examiner

SYSTEM AND METHOD FOR ESTABLISHING A PEER CONNECTION USING RELIABLE RDMA PRIMITIVES

RELATED APPLICATION

This application is related to U.S. patent application Ser. No. 10/622,558 entitled SYSTEM AND METHOD FOR RELIABLE PEER COMMUNICATION IN A CLUSTERED STORAGE SYSTEM, by Abhijeet Gole, et al., the contents of which are hereby incorporated by reference.

FIELD OF THE INVENTION

The present invention relates to clustered storage systems and, in particular, to establishing a connection using reliable remote direct memory access primitives.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by a storage system to be available for access to the greatest degree possible. Accordingly, some computer systems provide a plurality of storage systems organized in a cluster, with a property that when a first storage system fails, a second storage system is available to take over and provide the services and the data otherwise served by the first storage system. In particular, when a first storage system fails, the second storage system in the cluster assumes the tasks of processing and handling any data access requests normally processed by the first storage system. One such example of a cluster configuration is described in U.S. patent application Ser. No. 09/625,234 entitled NEGOTIATING TAKEOVER IN HIGH AVAILABILITY CLUSTER by Samuel M. Cramer, et al., the contents of which are hereby incorporated by reference.

In a typical cluster environment, there may be several cluster processes executing on each storage system ("cluster partner") that desire to communicate with corresponding "peer" processes executing on the other storage system partner in the cluster. One exemplary process is a cluster failover (CFO) monitoring process that determines if a cluster partner has failed and whether a takeover operation of storage (e.g., disks) served by the failed storage system should be initiated. To that end, the CFO monitor process sends routine "heartbeat" signals to its corresponding failover monitoring process to alert the cluster partner that its other partner is operating without any serious errors that would necessitate a failover. Typically, each of these peer processes utilizes its own protocol implementation for opening, closing, and managing network data connections to its corresponding peer process.

These processes typically communicate with each other using a conventional Virtual Interface (VI). However, some VI implementations do not provide connection primitives to implement peer-to-peer connections. These VI implementations include primitives for creating reliable VIs and to perform RDMA read/write operations to these reliable VIs. It is desirable for cluster partners using such implementations to be able to use the reliable VI connections.

SUMMARY OF THE INVENTION

The present invention overcomes the disadvantages of the prior art by providing a technique for establishing reliable peer-to-peer communication among storage system "partners" arranged in a clustered environment. A cluster connection manager is provided to create reliable virtual interface (VI) connections (or Infini Band QP connections) between peer processes executing on the storage system partner over a cluster interconnect without requiring a storage operating system executing on each storage system to be fully active or functioning. As used herein, the term VI should be read to include IB QP connections or any alternate technologies that provide RDMA capabilities. The peer processes of each storage system function as "cluster connection clients" that request the services of the cluster connection manager to establish and maintain VI connections with their peers on a cluster partner.

In the illustrative embodiment, the cluster connection manager is configured to open an initial reliable peer-to-peer connection over a cluster interconnect (and its associated adapters) by "slam connecting." As used herein, "slam connecting" is accomplished by connecting to a predetermined VI using a specified network address.

Remote direct memory access (RDMA) operations are generally conducted over the slam connected VI connection using only a remote VI number (i.e., a port number) and a Fibre Channel identifier (FCID)/IB LID (i.e., a network address). According to the technique, the cluster connection manager utilizes a predetermined and pre-assigned VI that, in turn, utilizes a predetermined remote VI and FCID to communicate with its cluster partner. Thus, the cluster connection manager may be operational before a higher level VI layer of the storage operating system has fllly initialized.

The cluster connection manager begins operation in an initial state and alternately performs RDMA read and write operations to its cluster partner to establish an initial peer-to-peer connection. The novel technique thus allows establishment of the peer-to-peer connection substantially earlier in the boot process, thereby enabling clients of a cluster connection manager to establish VI/QP communication even in the absence of connection primitives normally provided by the VI/IB implementation.

More generally, the technique permits the establishment of reliable peer-to-peer communication among computers in a cluster environment using any protocol that supports RDMA operations that support predetermined and predefined port numbers and network addresses.

BRIEF DESCRIPTION OF THE DRAWINGS

The above and further advantages of the invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
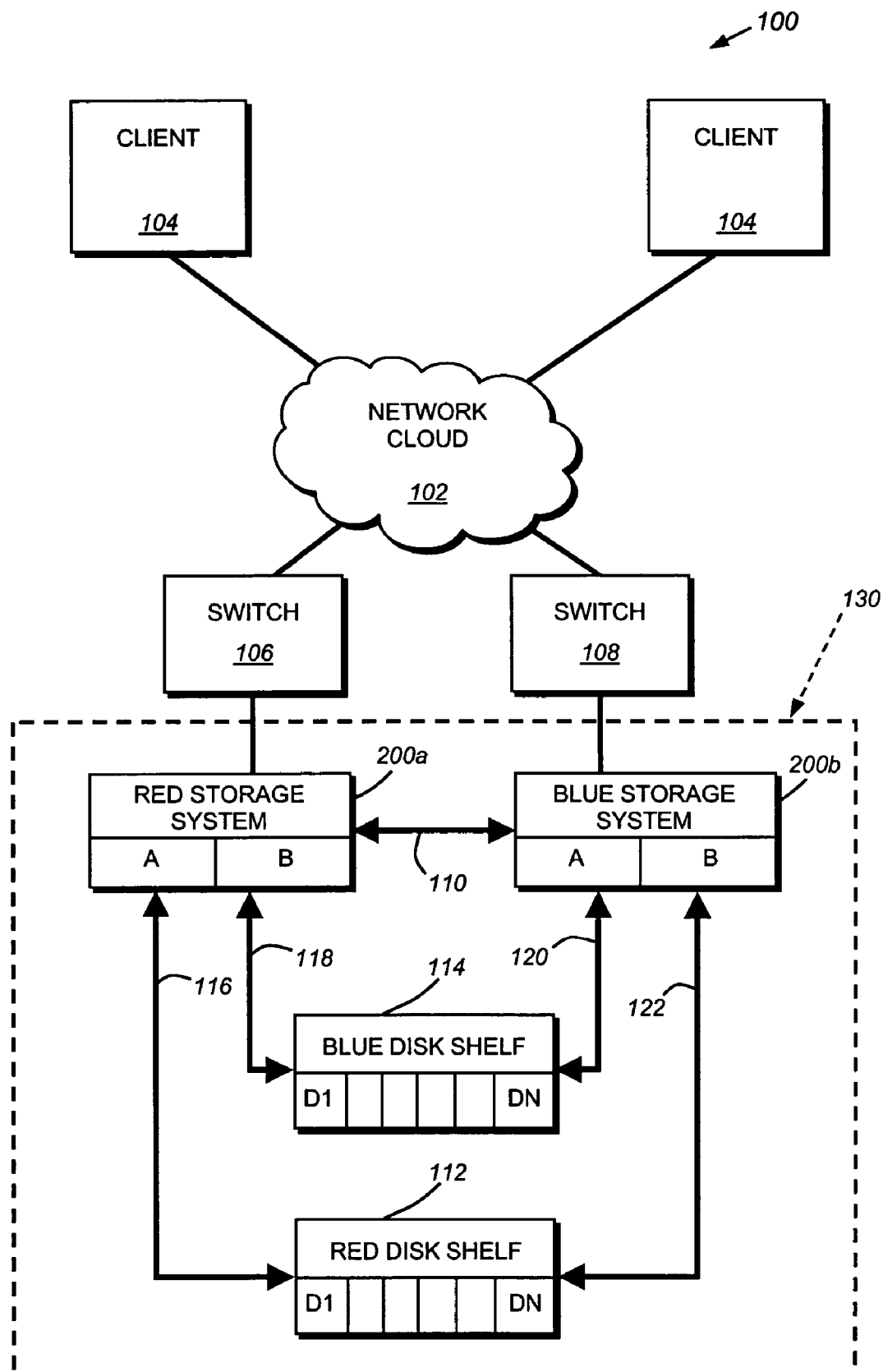
FIG. 1 is a schematic block diagram of an exemplary network environment having storage systems in a storage system cluster in accordance with an embodiment of the present invention.

FIG. 1 is a schematic block diagram of an exemplary network environment 100 in which the principles of the present invention are implemented. A network cloud 102 may comprise point-to-point links, wide area networks (WAN), virtual private networks (VPN) implemented over a public network (e.g., the Internet or a shared local area network, LAN) and/or any other acceptable networking architecture. However, in the illustrative embodiment, the network cloud 102 is configured as, e.g., a Fibre Channel (FC) switching network. FC is a set of related standards defining a transport service for a variety of data access protocols. Attached to the network cloud are clients 104 and intermediate network nodes, such as switches, 106 and 108, which connect to various storage devices, such as Red storage system 200a and Blue storage system 200b.

A client 104 may be a general-purpose computer, such as a PC, a workstation, or a special-purpose computer, such as an application server, configured to execute applications over a variety of operating systems that support block access protocols, including the UNIX® and Microsoft® Windows™ operating systems. Red storage system and Blue storage system 200 are connected as two nodes of a storage system cluster 130. These storage systems, described further below, are illustratively storage appliances configured to control storage of and access to interconnected storage devices. Each system attached to the network cloud 102 includes an appropriate conventional network interface arrangement (not shown) for communicating over the switching network 102, or through the switches 106 and 108.

In the illustrated example, Red storage system is connected to Red Disk Shelf 112 by data access loop 116 (i.e., Red Disk Shelf's A port). It should be noted that such a data access "A" loop can be any acceptable networking media including, for example, a Fibre Channel Arbitrated Loop (FC-AL). Similarly, the Red storage system accesses Blue Disk Shelf 114 via counterpart data access loop "B" 118 (i.e., Red Blue Disk Shelf's B port). Likewise, Blue storage system accesses Blue Disk Shelf 114 via data access A loop 120 (i.e., Blue Disk Shelf's A port) and Red Disk Shelf 112 through counterpart data access B loop 122 (i.e., Red Disk Shelf's B port). It should be noted that the Red and Blue disk shelves are shown directly connected to storage systems 200 for illustrative purposes only. That is, the disk shelves and storage systems may be operatively interconnected via any suitable FC switching network topology. During normal cluster operation, the storage system that is connected to a disk shelf via the disk shelf's A loop is the "owner" of the disk shelf and is primarily responsible for servicing data requests directed to blocks on volumes contained on that disk shelf. Thus, the Red storage system owns Red Disk Shelf 112 and is primarily responsible for servicing data access requests for data contained on that disk shelf. Similarly, the Blue storage system is primarily responsible for the Blue disk shelf 114. When operating as a storage system cluster, each storage system is configured to take over and assume data handling capabilities for the other disk shelf in the cluster 130 via the disk shelf's B port.

Connecting the Red and Blue storage systems is a cluster interconnect 110, which provides a direct communication link between the two storage systems. The cluster interconnect can be of any suitable communication medium, including, for example, an Ethernet connection. However, in the illustrative embodiment, the cluster interconnect 110 comprises an Infini Band (IB) data path. In an alternate embodiment, the storage systems may be connected via a plurality of cluster interconnects. This plurality of cluster interconnects facilitates multi-path and/or failover operations in the event that one or more of the cluster interconnects fail during routine operation of the storage system cluster environment.

B. Storage Appliance

Figure 2:
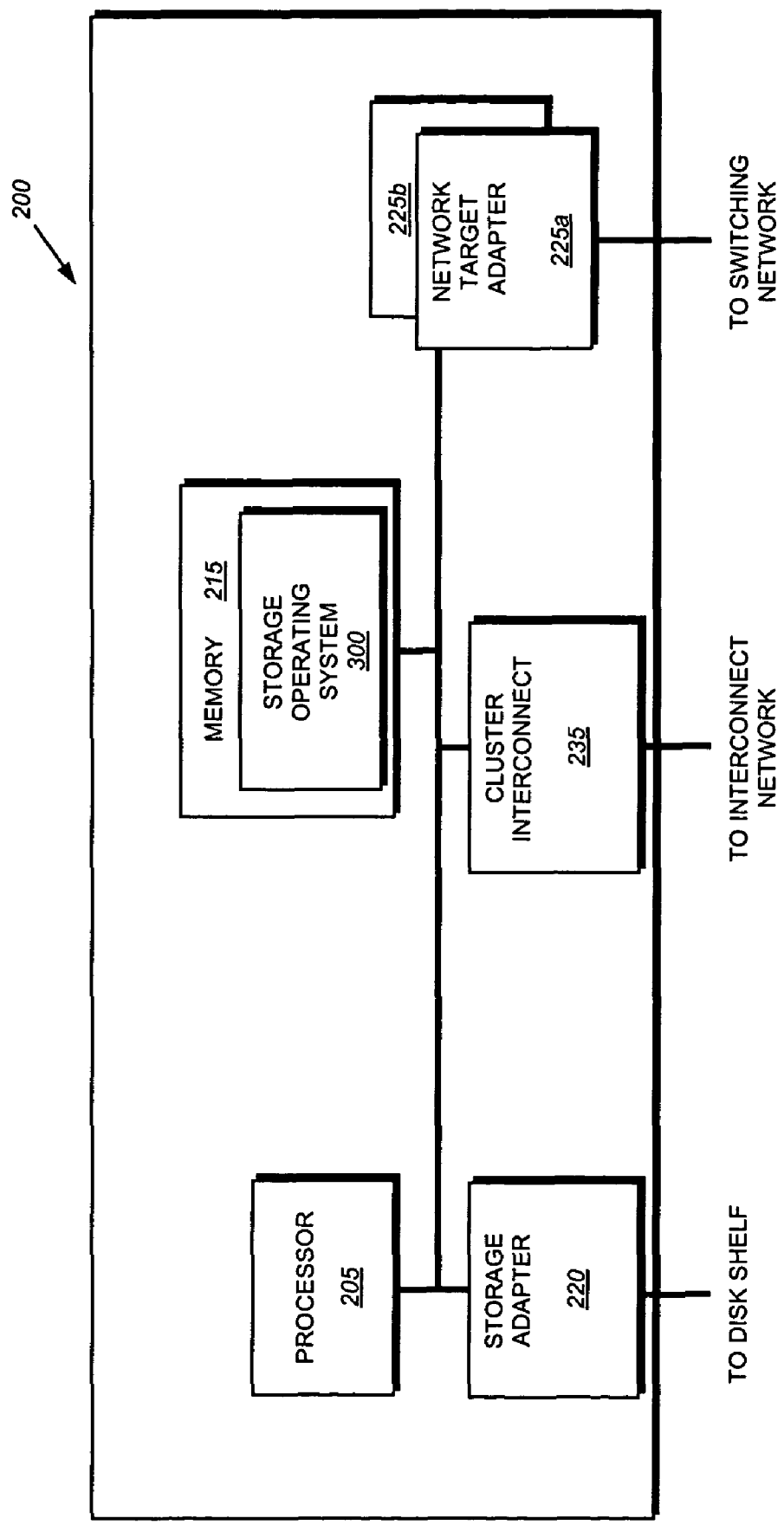
FIG. 2 is a schematic block diagram of an exemplary storage system in accordance with an embodiment of the present invention.

FIG. 2 is a schematic block diagram of an exemplary storage system 200 used in the cluster network environment 100 and configured to provide storage service relating to the organization of information on storage devices, such as disks. The storage system 200 is illustratively embodied as a storage appliance comprising a processor 205, a memory 215, a plurality of network adapters 225a, 225b and a storage adapter 220 interconnected by a system bus 230. The terms "storage system" and "storage appliance" are thus used interchangeably. The storage appliance 200 also includes a storage operating system 300 that logically organizes the information as a hierarchical structure of directories, files and virtual disks (vdisks) on the disks.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

Each network adapters 225a, b may comprise a network interface card (NIC) having the mechanical, electrical and signaling circuitry needed to couple the storage appliance to the switch 106, 108. Each NIC may include an interface that is assigned one or more IP addresses, along with one or more media access control (MAC) addresses. The clients 104 communicate with the storage appliance by sending packet requests for information to these addresses in accordance with a predefined protocol such as TCP/IP.

The storage adapter 220 cooperates with the storage operating system 300 executing on the storage appliance to access information requested by the clients 104. The information may be stored on the disks or other similar media adapted to store information. The storage adapter includes input/output (I/O) interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets and returned to the clients.

Storage of information on the storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage area network (SAN) client. Each "on-disk" file may be implemented as set of disk blocks configured to store information, such as data, whereas the directory may be implemented as a specially formatted file in which names and links to other files and directories are stored.

Also connected to the system bus 230 is one or more cluster interconnect adapters 235. Each cluster interconnect adapter 235 provides a specific network interface over a cluster interconnect 110 to a cluster partner of the storage system for various partner-to-partner communications and applications. The cluster interconnect may utilize various forms of network transport media, including, for example, Ethernet, Fibre Channel or Infini Band links. A plurality of cluster interconnects and adapters may be utilized for multi-path and/or failover configurations in the event that one or more of the cluster interconnects fail during operation of the storage systems.

C. Storage Operating System

In the illustrative embodiment, the storage operating system is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems is configured to perform a storage function and associated with other equipment or systems.

Figure 3:
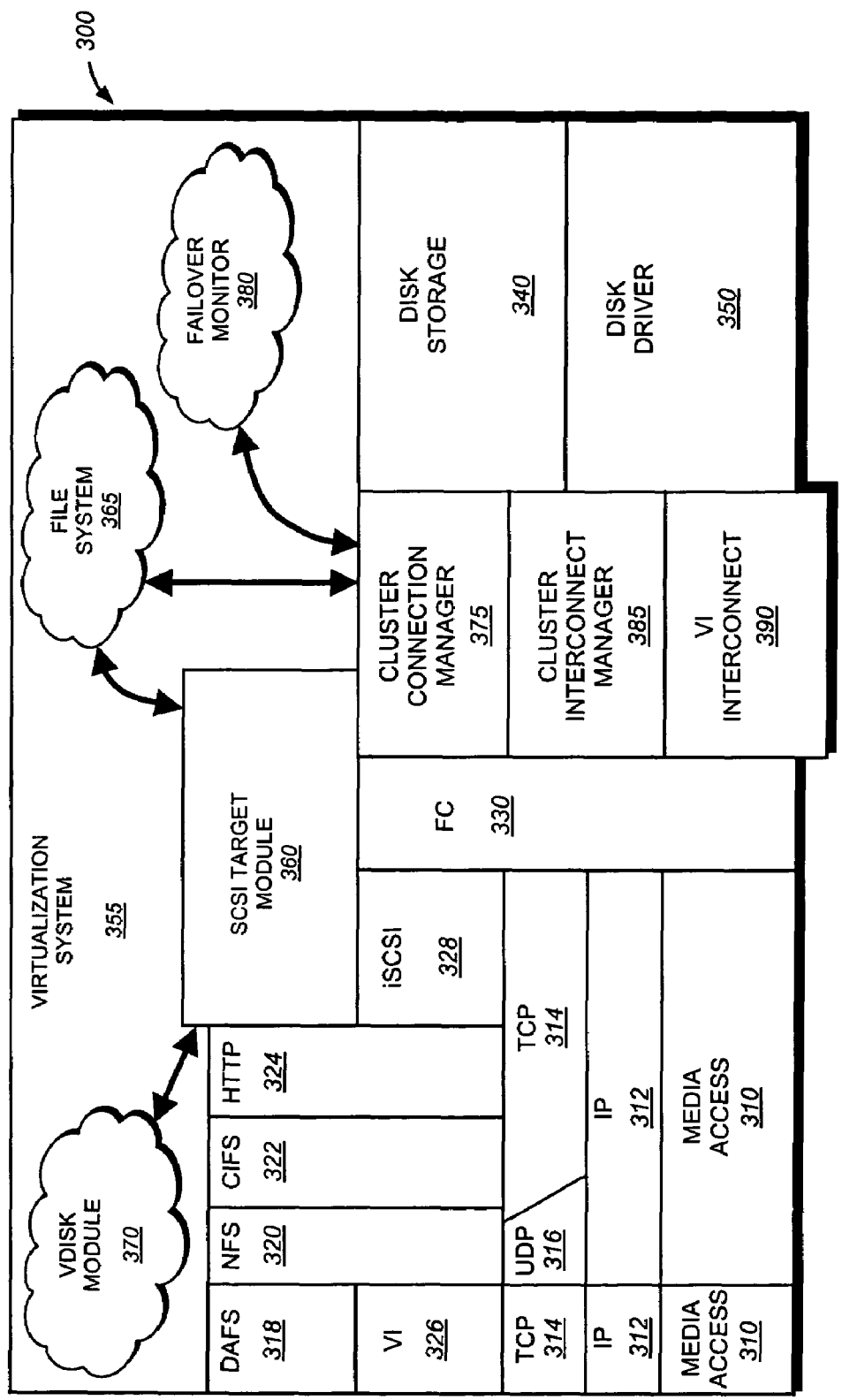
FIG. 3 is a schematic block diagram of an exemplary storage operating system executing on a storage system for use in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates to receive and transmit block access requests and responses to and from the storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage appliance 200. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 328, 330 and the file system 365 to thereby provide a translation layer of the virtualization system 355 between the SAN block (lun) space and the file system space, where luns are represented as vdisks. By "disposing" SAN virtualization over the file system 365, the multi-protocol storage appliance reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the contents of which are hereby incorporated by reference.

The storage operating system 300 further includes, in the illustrative embodiment, a cluster connection manager 375 embodied as hardware, software, firmware or a combination thereof that is configured to establish and maintain peer-to-peer connections between the peer processes executing on the storage system and its partner storage system to thereby provide a centralized peer-to-peer communication access point for connection manager applications.

A cluster connection 335 client is illustratively a process, thread or program executing on the storage system that utilizes the services, such as connection creation and/or management of the cluster connection manager to open and maintain communication with a cluster peer process. An exemplary cluster connection client is a cluster failover (CFO) monitor 380 that implements various failover features, including, for example, initiating a failover in the event that the partner storage system fails or otherwise suffers a non-transient error condition. An exemplary failover monitor implementation that may be advantageously used with the present invention is described in U.S. patent application Ser. No. 10/011,844, entitled EFFICIENT USE OF NVRAM DURING TAKEOVER IN A NODE CLUSTER, by Abhijeet Gole, et al., the contents of which are hereby incorporated by reference as though fully set forth herein. It should be noted that other connection manager applications or "clients" may be utilized within storage operating system 300. The use of a failover monitor 380 as a connection manager client is for exemplary purposes only. Other cluster connection clients 385 may interface with the cluster connection manager 375.

In accordance with the illustrative embodiment of the present invention, the cluster connection manager 375 is initialized early in the booting process of the storage operating system 300. Once initialized, the cluster connection manager initiates a peer-to-peer connection with its cluster partner as described further below.

In alternate embodiments, a storage operating system may include a plurality of cluster connection managers 375. The plurality of cluster connection managers may be distributed among a plurality of cluster interconnect devices. Similarly, a plurality of connection manager clients may be distributed among the plurality of cluster connection managers. These cluster connection mangers may be utilized for failover and/or load balancing as described in the above-incorporated application entitled SYSTEM AND METHOD FOR RELIABLE PEER COMMUNICATION IN A CLUSTERED STORAGE SYSTEM.

D. Establishing An Initial Reliable Peer-to-Peer Connection

In accordance with an illustrative embodiment of the present invention, the cluster connection manager 375 of the storage operating system 300 performs all peer-to-peer communications between the storage system of cluster 130. To that end, the cluster connection manager 375 initially creates a peer-to-peer connection with the storage system's cluster partner using the novel method described below. It should be noted that while this description is written in terms of storage operating systems executing on clustered storage appliances, the principles of the present invention may be applied to any cluster of computers utilizing VI, InfiniBand or other protocols supporting RDMA operations.

Figure 4:
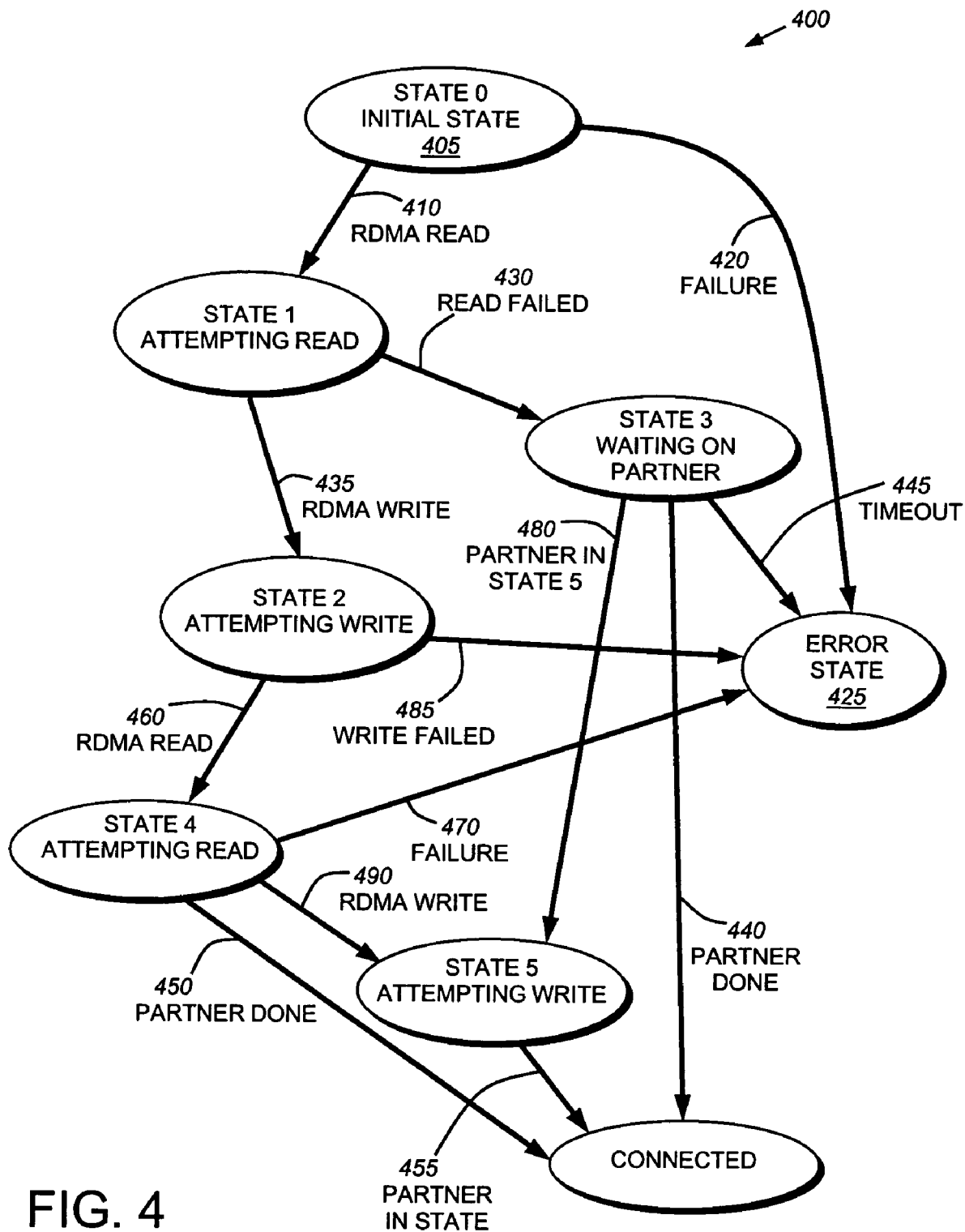
FIG. 4 is a state diagram showing the various states that a storage system may pass through while establishing a peer-to-peer connection in accordance with an embodiment of the present invention.

FIG. 4 is an exemplary state diagram 400 that shows various states related to the connection manager of a storage system when establishing an initial peer-to-peer connection with, for example, a peer connection manager of a cluster partner. The connection manager (storage system) initially begins in state zero (Initial State) 405, typically upon the initialization or "power on" of the storage system. The cluster connection manager then performs a RDMA read operation (event 410) directed towards a specific and predefined memory address in the cluster partner's memory storing configuration. This RDMA read operation is performed using a slam connection, i.e., a predetermined and predefined VI number and FCID, as the VI layer 326 of the storage operating system 300 may not be operative.

According to the known VI specification, a connection must exist between two VIs before any VI operation, such as a RDMA operation, may be executed over the VI. A VI connection is typically opened through a process of exchanging connection information between two end points of the VI connection. For example, when VI is implemented over the FC protocol, this connection information consists of two values: a remote VI number and a remote fibre channel ID (FCID). A connection is considered established when the FC-VI hardware (e.g., the cluster interconnect 110 and cluster interconnect adapter 235) has initialized the VI connection state and each endpoint would know the two values of the other end point of the VI connection. Typically, the exchange of connection information is accomplished by exchanging special FC-VI connection protocol handshaking messages. However, the exchange of these messages typically requires that the VI layer 326 of the storage operating system be fully functional.

As such, the RDMA operation utilizes, for example, a predetermined FCID and a predetermined VI number. In response to the RDMA read operation 410, the cluster connection manager transitions to state 1 (Attempting Read). If the RDMA read operation fails (event 430), then the cluster partner has not reached a ready state to process RDMA operations and the cluster connection manger transitions to state 3 (Waiting on Partner).

While in state 3 (Waiting on Partner), the cluster connection manager periodically examines a specified variable stored at a specific memory location. This variable is modified via a RDMA write operation by the cluster partner when the peer cluster connection manger reaches a either state 5 or the completed state. If the variable is modified to alert the cluster connection manager that the partner is in state 5, then the cluster connection manager transitions to state 5 (event 435). Similarly, if the variable is modified so that it identifies the partner system as being complete with the initialization routine, the connection manager transitions to the connected states (event 440).

If, however, a time out occurs while the connection manager is in state 3 (Waiting on Partner) 440, the cluster connection manager enters an error state 425. The time out value may be predefined and/or user defined to accommodate varying network topologies and potential delay factors in the message passing capabilities of the physical transport link (the cluster interconnect) between the storage system partner of the cluster.

If the RDMA read operation (action 410) succeeds, the cluster connection manager transitions to state 2 (Attempting Write) where it performs an RDMA write operation (action 435) to the storage system cluster partner. This RDMA write operation is directed to a specified and pre-determined memory location in the storage system partner, which is illustratively the same memory location that is monitored by the partner in state 3 (Waiting on Partner). If the RDMA write operation fails, the cluster connection manager moves to the error state 425. The failure of the RDMA write operation signifies that the storage system cluster partner is not in a ready state or that an error condition has occurred between the completion of the successful RDMA read operation and the execution of the RDMA write operation.

However, if the write operation succeeds, the connection manager then attempts a second RDMA read operation (event 460) and transitions to state 4 (Attempting Read). If the read operation fails, the connection manager moves to the error state (event 465). Otherwise, the connection manager attempts an additional RDMA write operation (action 490) and transitions to state 5 (Attempting Write). Once in state 5, the connection manager will wait until its partner has reached state 5 (event 470) before being connected. The connection manager will be alerted that the partner is in state 5 by the successful RDMA write operation from its partner. Once the connection manager is in the connected state, the cluster connection managers have established a connection with their corresponding peer connection manager.

To again summarize, the present invention is directed to a novel system and method for establishing reliable peer communication in a clustered environment. Specifically, the technique enables a cluster pair to establish VI/QP connections without requiring upper level layers of the storage operating system to be fully initialized. The initial peer connection is established by performing a series of RDMA read and write operations. Once a reliable VI connection has been made, the cluster connection manager gathers connection information from cluster connection clients to be passed to its partner. The cluster connection manager then generates the appropriate VIs and alerts its partner that it has reached a ready state. Cluster connection clients may then utilize the created Vis for communicating with their cluster partner peer pair.

In certain embodiments, the storage systems may include a plurality of cluster interconnects. That enables storage system failover from one cluster interconnect to another in the event that a cluster interconnect or adapter suffers an error condition. Such failover is desirous to ensure continual communication among connection clients and their corresponding cluster partner connection clients.

In another alternative embodiment, multiple instantiations of a connection manager may be executing on the storage system. Each instantiation of the cluster connection manager may be associated with one or more cluster connection clients. Additionally, each cluster connection manager may be associated with one or more cluster interconnects. Thus, in the event of a failure of a cluster interconnect an individual instantiation of the cluster connection manager may failover to another cluster interconnect.

The teachings of the present invention may be generalized to any peer-to-peer communication system that utilizes a predetermined and predefined hardware address, port number and configuration data location. In the illustrative embodiment, the hardware address is the FCID, the port number is the VI and the known memory address is the configuration data location. In alternate embodiments, the hardware address may comprise an IP address, a port number may comprise a TCP port, and/or the configuration data location may be a known memory address.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for initiating a peer-to-peer communication session, the method comprising:
    initiating a boot process;
    initializing a cluster connection manager in the booting process before a storage operating system executing on a cluster partner is fully active;
    initiating, by the cluster connection manger, a first remote direct memory access (RDMA) read operation directed to a cluster partner before a storage operating system executing on the cluster partner is fully active, the RDMA read operation bypassing the operating system;
    performing, in response to a successful first RDMA read operation, a first RDMA write operation to the cluster partner;
    performing, in response to a successful RDMA write operation, a second RDMA read operation directed to the cluster partner; and
    performing, in response to a successful second RDMA read operation, a second RDMA write operation to the cluster partner before a storage operating system executing on the cluster partner is fully active, in the booting process.

2. The method of claim 1 wherein the step of attempting a first RDMA read operation further comprises the step of issuing a RDMA read operation to the cluster partner requesting a pre-set memory address location that is associated with a status variable on the cluster partner.

3. The method of claim 1 further comprising:
    exchanging a set of peer connection information;
    passing a set of client information to the cluster partner;
    creating a set of appropriate communication ports;
    alerting the cluster partner of a ready status; and
    alerting a set of clients that the cluster partner is in a ready state.

4. The method of claim 3 wherein the set of peer connection information comprises a version number.

5. The method of claim 3 wherein the step of passing a set of client information to the cluster partner further comprises: collecting, from a set of clients, the set of client information; and transferring the collected set of client information to the cluster partner.

6. The method of claim 5 wherein the client information comprises a number of communication ports required.

7. The method of claim 5 wherein the set of client information further comprises an amount of memory requested by a particular client.

8. The method of claim 1 wherein the cluster partner is a storage system.

9. The method of claim 1 wherein the cluster partner is an application server.

10. A method comprising:
    initiating a boot process;
    initializing a cluster connection manager in the boot process before a storage operating system executing on a cluster partner is fully active;
    initiating, a peer-to-peer communication session, by a cluster connection manager, before a storage operating system executing on the cluster partner is fully active which bypasses an operating system on a storage system by attempting a first remote direct memory access read operation directed to a predefined hardware address and a predefined port number, the predefined hardware address and the predefined port number previously known to support a RDMA operation; and
    performing, in the booting process before a storage operation system executing on the cluster partner is fully active, in response to a successful initiating, a first remote direct memory access write operation directed to the predefined hardware address and the predefined port number.

11. The method of claim 10 further comprising:
    performing, in response to a successful first remote direct memory access write, a second remote direct memory access read operation directed to the predefined hardware address and the predefined port number.

12. The method of claim 10 wherein the predefined hardware address comprises a fibre channel identifier.

13. The method of claim 10 wherein the predefined port number comprises a virtual interface.

14. The method of claim 10 wherein the first remote direct memory access is delivered to a predefined memory address storing booting status information.

15. A system configured to establish reliable peer-to-peer communication among storage system of a clustered environment, the system comprising:
    a booting process executed by a processor;
    a peer process executing on each storage system partner having an operating system; and
    a cluster connection manager executing on each storage system partner, the cluster connection manager establishing a reliable peer-to-peer connection between each peer process in the booting process before a storage operating system executing on a cluster partner is fully active be connecting to a predetermined port number using a predetermined network address, the reliable peer-to-peer connection bypassing the operating system and initiate a remote direct memory access (RDMA) read operation directed to a cluster partner.

16. The system of claim 15 wherein the reliable peer-to-peer connection is established without requiring a storage operating system executing on each storage system partner to be fully functioning.

17. The system of claim 15 wherein the peer-to-peer connection is a virtual interface connection.

18. The system of claim 15 wherein the peer process is a cluster connection client that requests services from the cluster connection manager.

19. A system configured to open initial peer-to-peer connection over a cluster interconnect, the system comprising:
    a storage system having an operating system;
    a booting process executed by a processor;
    a cluster connection manager executing on the storage system, the cluster connection manager configured to establish a peer connection in the booting process before a storage operating system executing on a cluster partner in fully active on a predetermined port number and using a predetermined network address with in the storage system the peer-to-peer connection bypassing the operating system and initiate a remote direct memory access (RDMA) read operation directed to a cluster partner; and a process executing on the storage system, the process configured to use the established peer connection for communication.

20. The system of claim 19 wherein the peer-to-peer connection is a virtual interface connection.

21. The system of claim 19 wherein the process executing on the storage system is a cluster connection client that requests services from the cluster connection manager.

22. The system of claim 19 wherein the process executing on the storage system communicates with a cluster partner using the established peer connection.

23. A system configured to accept the initiation of a peer-to-peer connection over a cluster interconnect, the system comprising:

a storage system having an operating system;
a booting process executed by a process;
a cluster connection manager executing on the storage system, the cluster connection manager executing on the storage system, the cluster connection manager configured to accept a peer connection on a predetermined port number and using a predetermined network address within the storage system and initiate a remote direct memory access (RDMA) read operation to a cluster partner in the booting process before a storage operating system executing fully active; and a process executing on the storage system, the process configured to read information from the established peer connection.

24. The system of claim 23 wherein the peer-to-peer connection is a virtual interface connection.

25. The system of claim 23 wherein the process executing on the storage system is a cluster connection client that requests services from the cluster connection manager.

26. The system of claim 23 wherein the process executing on the storage system reads information from a cluster partner.

27. The system of claim 23 wherein the information comprises heartbeat signals.

28. A computer readable medium containing executable program instructions executed by a processor, comprising:

program instructions that initiate a booting process;

program instructions that initialize a cluster connection manager in the booting process before a storage operating system executing a cluster partner is fully active;

program instructions that initiate in the booting process, a first remote direct memory access (RDMA) read operation before a storage operating system executing on a cluster partner is fully active;

program instructions that perform, in response to a successful RDMA write operation, a second RDMA read operation directed to the cluster partner; and program instructions that perform in the booting process before a storage cooperating system executing on the cluster partner is fully active, in response to a successful second RDMA read operation, a second RDMA write operation to the cluster partner.

* * * * *